United States Patent [19]

Schafhaupt et al.

[11] Patent Number: 5,591,904
[45] Date of Patent: Jan. 7, 1997

[54] APPARATUS FOR DIMINISHING INTAKE VORTEXES IN JET ENGINES

[75] Inventors: Horst Schafhaupt, Egenhofen; Josef Ballmann, Aachen, both of Germany

[73] Assignee: Rheinhold & Mahla AG, München, Germany

[21] Appl. No.: 325,934

[22] Filed: Oct. 19, 1994

[30] Foreign Application Priority Data

Oct. 21, 1993 [DE] Germany .......................... 43 35 872.1

[51] Int. Cl.⁶ .................................................. B64C 21/08
[52] U.S. Cl. ........................ 73/117.4; 73/147; 181/210; 244/114 B
[58] Field of Search .................................. 73/117.4, 147; 181/210; 244/114 B

[56] References Cited

U.S. PATENT DOCUMENTS

| | | |
|---|---|---|
| 2,685,936 | 8/1954 | Brenneman . |
| 2,849,077 | 8/1958 | Kopke .................................. 181/210 |
| 3,037,726 | 6/1962 | Phillips ............................... 244/114 B |
| 3,055,176 | 9/1962 | Peterson ............................. 244/114 B |
| 3,096,847 | 7/1963 | Hardy ................................. 244/114 B |
| 3,126,176 | 3/1964 | Lynn .................................. 244/114 B |
| 3,191,728 | 6/1965 | David ................................. 244/114 B |
| 3,604,530 | 9/1969 | Duthion et al. . |
| 3,698,509 | 10/1972 | Fitting et al. . |
| 3,783,968 | 1/1974 | Derry ................................. 244/114 B |
| 3,797,787 | 3/1974 | Watanabe ............................ 244/114 B |
| 3,946,830 | 3/1976 | Kutney et al. ...................... 181/33 HA |
| 4,094,379 | 6/1978 | Steinberger ........................ 181/210 |
| 4,095,669 | 6/1978 | Bond, Sr. .......................... 181/210 |
| 4,158,401 | 6/1979 | Matsumoto et al. .................. 181/210 |
| 4,258,823 | 3/1981 | Ganz et al. . |
| 4,274,506 | 6/1981 | Blomgren et al. ................... 181/210 |
| 4,471,924 | 9/1984 | Lynn .................................. 244/114 B |
| 4,502,875 | 3/1985 | Ballard .............................. 55/306 |
| 4,958,700 | 9/1990 | Schafhaupt . |
| 5,031,721 | 7/1991 | Barden et al. ...................... 181/210 |
| 5,127,609 | 7/1992 | Lynn .................................. 244/114 B |
| 5,377,534 | 1/1995 | Boet .................................. 73/116 |

FOREIGN PATENT DOCUMENTS

| | | | |
|---|---|---|---|
| 978782 | 12/1975 | Canada ................................. | 244/11 B |
| 0312396 | 4/1989 | European Pat. Off. ............ | 244/114 B |
| 2202563 | 7/1973 | Germany . | |
| 2213352 | 9/1973 | Germany . | |
| 395752 | 7/1965 | Switzerland . | |
| 518214 | 3/1972 | Switzerland . | |
| 594139 | 12/1977 | Switzerland . | |
| 910056 | 11/1960 | United Kingdom ................. | 244/114 B |
| 8900130 | 1/1989 | WIPO ................................. | 244/114 B |

OTHER PUBLICATIONS

Aviation Week, Dec. 28, 1953, p. 30.

*Primary Examiner*—Richard Chilcot
*Assistant Examiner*—Eric S. McCall
*Attorney, Agent, or Firm*—Browdy and Neimark

[57] ABSTRACT

For the purpose of diminishing intake vortexes at jet engines with turbo-compressors of aircrafts, in particular during test runs, an apparatus is provided, which consists of a grating disposed near the ground below and directly in front of the engine inlet, which grating comprises short, approximately vertically extending wind tunnels.

18 Claims, 2 Drawing Sheets

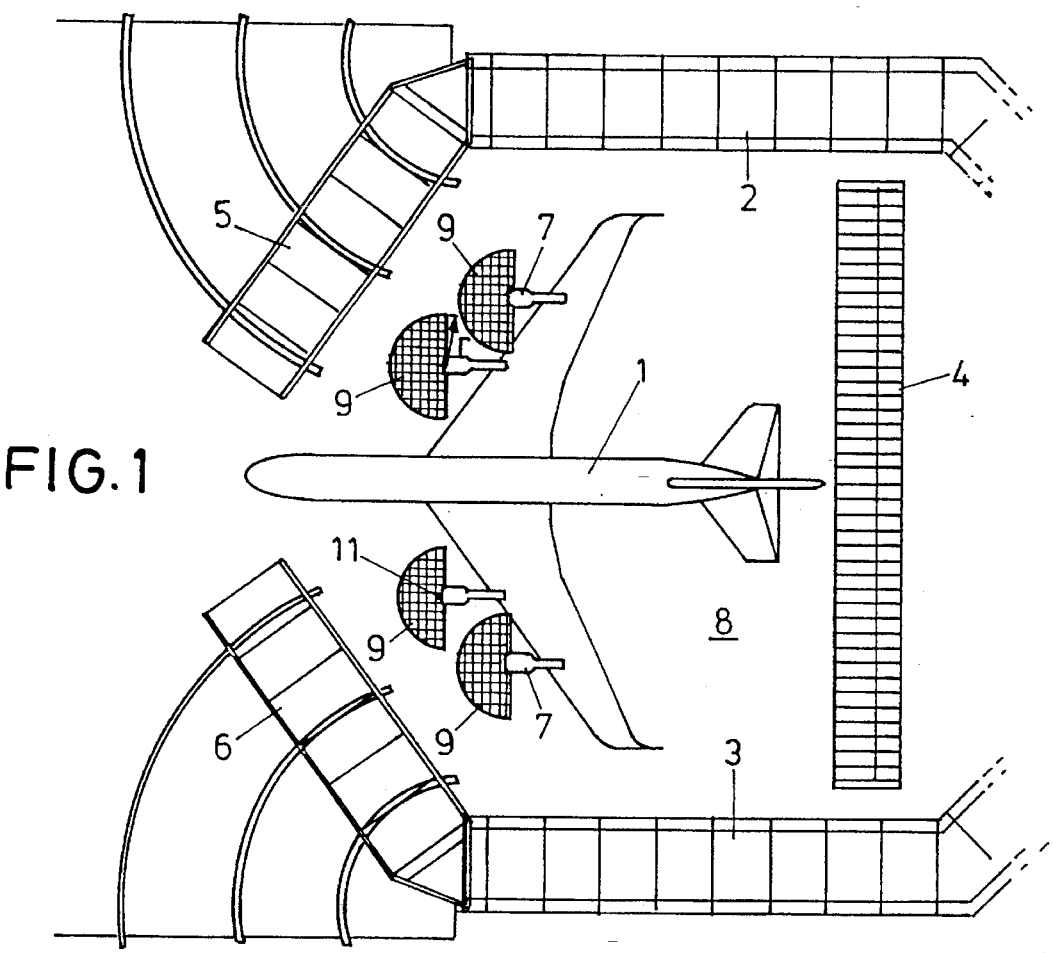
FIG. 1
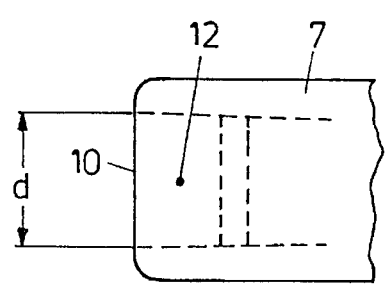
FIG. 2
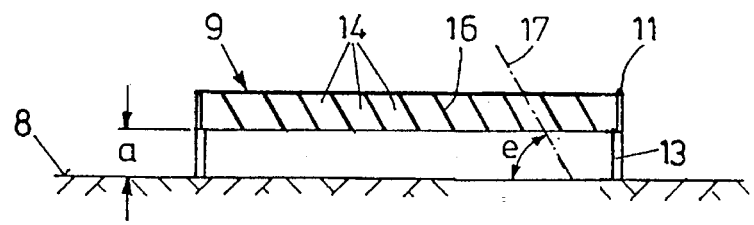

APPARATUS FOR DIMINISHING INTAKE VORTEXES IN JET ENGINES

BACKGROUND OF THE INVENTION

1. Field of the Invention

The invention relates to an apparatus for diminishing intake vortexes in jet engines with turbo-compressors of aircrafts during test runs.

2. Background Art

For routine check-outs of the jet engines of an aircraft, static test runs on the ground are necessary, in which the engines are loaded to their limit of capacity. To that end, aircraft manufacturers indicate upper limits for the wind velocity in dependence on the wind direction relative to the aircraft axis, which tapper limits have to be taken into account during the test runs. The necessity of these restrictions results from the fact that in case of unfavorable wind conditions, in the intake stream of the engine, very high disturbances of the field of velocity are created by extensive vortex structures, in particular by a concentrated, strong individual vortex spread from the ground, which vortex may cause malfunctions of the engine process with a possible shortening of engine life. Therefore, for the engine test, the aircraft is placed in the wind so that the engines are blown against as axially from the front as possible.

Often, the standing direction of the aircraft on the test location is predetermined, e.g. whenever there is a noise protection facility available which is stationary on the ground, as it is described for example in U.S. Pat. No. 4,958,700. When constructing such facilities, the prevailing wind direction at the site often cannot be taken into consideration, but an already existing built-up area is decisive for the intended noise protection. However, in this case the number of tests to be conducted under these prerequisites can be considerably restricted, as the cited vortex structures are more likely to be generated, and may develop a higher strength, due to an unfavorable blower stream or due to close walls or edges of the noise protection facility, respectively.

The air quantity taken in by the turbo-compressor of an engine depends on the type, while the air velocity in the intake stream locally may clearly be more than 100 m/s. In this intake stream, as a rule a concentrated vortex is generated with the taken in air masses rotating about the axis of the vortex. The vortex may originate from a near edge, a near wall or also from the ground. The axis of the vortex may be visualized from the place of origin as far as into the engine inlet. In this case this vortex is not stationary, but its starting point moves, its axis deforms and also the place of entrance into the engine changes. As a rule, shortly after its creation, the movement range of the concentrated vortex stabilizes to a limited region in front of the engine, the starting point of the vortex moving to and fro in the boundary layer of the ground in front of the engine inlet. At this time, the vortex reaches its highest strength. The strength of the vortex, however, is the decisive variable for malfunctions in the compressor of the engine in form of burbles and in the combustion chamber of the engine in form of critical conditions, which may result in an emergency shutdown of the engine.

SUMMARY OF THE INVENTION

It is therefore the object of the present invention to create an apparatus with the aid of which the aforesaid critical conditions can be prevented or can be reduced in their frequency of occurrence.

This object is attained in accordance with the invention by a grating with short, approximately vertically extending wind tunnels being disposed near the ground below and directly in front of the engine inlet. By means of such a grating serving as a stream grid, the concentration of the vortex is decisively obstructed in the region where it is generated on the boundary layer of the ground. Surprisingly, it has turned out that the provision of such a grating results in that the formation of a vortex is obstructed and thus the blowing conditions are improved and that—as was to be expected—the smooth concrete usually available on such test locations does not lead to an improvement of the blowing conditions.

In this case, it is expedient, if the grating has a semicircular shape with a radius corresponding to twice the diameter of the engine inlet. Furthermore, the central point of the grating is advantageously provided approximately perpendicular below the center of the engine inlet.

The width of the grating mesh should correspond approximately to the height of the mesh or to the height of the grating.

On this occasion, it is particularly advantageous if the length of the wind tunnels formed by the meshes of the grating as well as the width of the mesh do not exceed the smallest blade distances of the turbo-compressor of the engine. Hereby only a diffused, small-structured vorticity is generated, which can no longer concentrate to form a strong individual vortex reaching the engine inlet. An intensification of the grating effect can be achieved by the fact that the wind tunnels of the grating comprise an axis facing upward away from the engine.

The different heights of the engine above the ground can be taken into account by an adjustable distance of the grating from the ground.

The construction and function of an example of embodiment according to the invention are further described, taken in conjunction with a diagrammatic drawing.

BRIEF DESCRIPTION OF THE DRAWING

FIG. 1 shows a plan view of an aircraft in a noise protection facility with gratings, FIG. 2 shows a longitudinal section taken along a grating established on the ground with an engine inlet disposed above it, in a diagrammatic view.

DESCRIPTION OF THE PREFERRED EMBODIMENT

Figure 3:
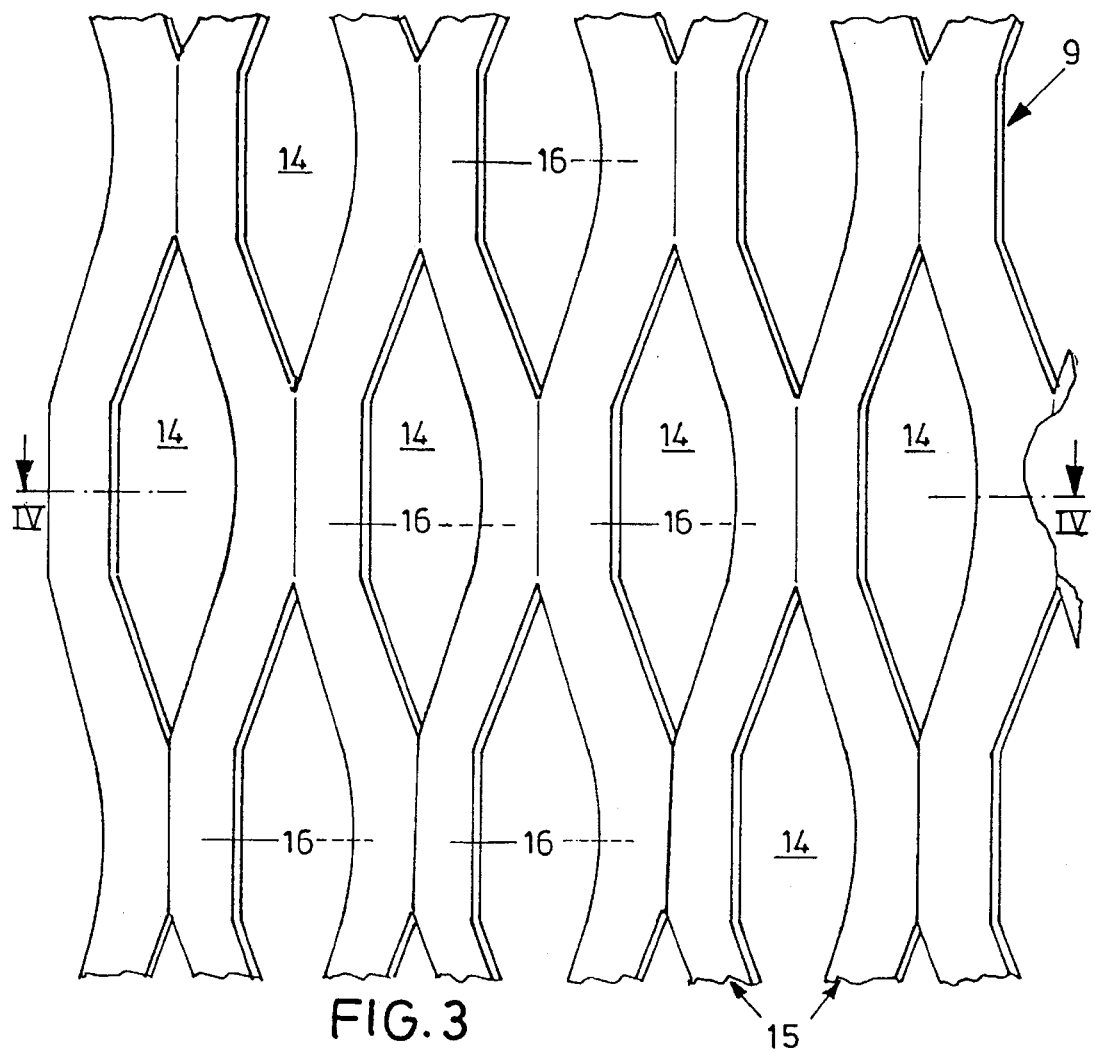
FIG. 3 shows a plan view of a more detailed illustration of a grating.

As can be seen from FIG. 1, an aircraft placed in readiness for a test run is surrounded on all sides by a noise protection facility, which is known for example from U.S. Pat. No. 4,958,700 and which comprises lateral noise protection walls 2 and 3, a rearward deflection grid 4 and swing gates 5 and 6 lined with noise absorbing means.

The aircraft 1 comprises for instance four jet engines 7, which as usual comprise a turbo-compressor and a combustion chamber. Below the engines 7, gratings 9 are disposed each near the ground 8. These gratings 9 have a semicircular shape and a radius r, which corresponds to twice the diameter d of the engine inlet 10. The diameter d of the engines 7 of large aircrafts 1 is usually $1.5 \text{ m} \leq d \leq 2.5 \text{ m}$ and in particular d≈2 m. Consequently, the radius r of the is usually m<r<5 m and in particular r≈4 m. The central point 11 of these semi-circular gratings 9 is provided approximately perpendicular below the center of the engine inlet 10.

The association of the grating 9 with the engine 7 can be seen from FIG. 2. This grating 9 is disposed at a given distance a above the ground 8 by way of supports 13, this distance a being adjustable in dependence on the respective height of the engine 7 above the ground 8. In practice, the distance a is 50 mm≦a≦200 mm and in particular a≈100 min.

Figure 4:
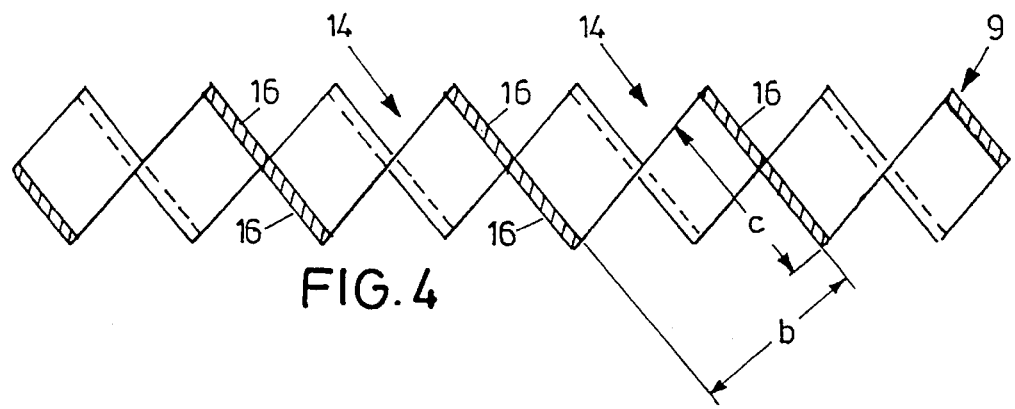
FIG. 4 shows a vertical section taken along the grating according to FIG. 3.

This grating 9 shown in detail in FIGS. 3 and 4 comprises meshes 15 formed as short wind tunnels 14, the width b and the height c of such a wind tunnel 14 being approximately equal.

As can be seen from FIGS. 3 and 4 the grating 9 consists of a so-called expanded metal or diamond mesh, i.e. it is produced by punching and deforming sheet metal. The webs created by the deformation form side walls 16 of the wind tunnels 14, of which the central axis 17 is inclined in relation to the ground 8, namely by an angle e which is larger than 45°.

In order to achieve a diffused, small-structured vorticity of the upward vortex and thus to prevent it from concentrate to form a strong individual vortex reaching the engine inlet 10, the width b and the height c of such a wind tunnel 14 should not exceed the smallest blade distances of the compressor of the engine 7. Therefore, b≈35 mm and c≈30 mm are the respective width and height of b and c.

The intended effect of resolving a strong individual vortex into small-structured vortexes is still intensified by the fact that the side walls 16 of the wind tunnels 14 are not disposed perpendicular to the ground 8, but that the central axis 17 of the wind tunnels 14 face away from the engine 7 in an inclined upward manner.

This means that by arranging such gratings 9 below the engine inlets 10, the generation of strong stream-in vortexes can be prevented or can at least be strongly reduced. In this way, the availability of such noise protection facilities for engine tests can be considerably increased. This improves the acceptance of these noise protection facilities by the users and thus contributes to the reduction of environmental pollution.

What is claimed is:

1. A grating structure located on ground (8) in front of, spaced from and below an engine inlet (10) of a jet engine having a turbo-compressor for diminishing intake vortexes in the jet engine, said grating structure comprising a grate (9) having meshes (15) with a width (b) and a height (c) which form approximately vertically extending wind tunnels (14), said grate (9) being disposed substantially horizontal, near and above the ground (8) and below and directly in front of the engine inlet (10) which has a diameter (d), wherein said grating structure diminishes intake vortexes in the jet engine.

2. An apparatus according to claim 1, wherein the grate (9) has a semi-circular shape and a radius (r), which corresponds to twice a diameter (d) of the engine inlet (10).

3. An apparatus according to claim 1, wherein a central point (11) of the grate (9) is provided approximately perpendicular below a center (12) of the engine inlet (10).

4. An apparatus according to claim 1, wherein the width (b) of the meshes (15) of the grate (9) correspond approximately to the height (c) of the meshes (15).

5. An apparatus according to claim 4, wherein the height (c) of the wind tunnels (14) formed by the meshes (15) of the grate (9) as well as the width (b) of the meshes (15) do not exceed a smallest blade distance of the turbo-compressor of the engine (7).

6. An apparatus according to claim 1, wherein the wind tunnels (14) of the grate (9) comprise a central axis (17) inclined in relation to the ground (8).

7. An apparatus according to claim 1, wherein the distance (a) from a grate (9) to the ground (8) is adjustable.

8. An apparatus according to claim 2, wherein the radius (r) of the grate (9) is between 3 m and 5 m.

9. An apparatus according to claim 1, wherein the grate (9) is disposed at a distance (a) above the ground (8) of between 50 mm and 200 mm.

10. An apparatus according to claim 1, wherein the grate (9) is disposed at a distance (d) above the ground (8) of 100 mm.

11. A grating structure located on ground (8) in front of, spaced from and below an engine inlet (10) of a jet engine (7) having a turbo-compressor, said grating structure used for diminishing intake vortexes in the inlet (10) of the jet engine (7) during test runs on the ground (8), and comprising:

a grate (9) having a semi-circular shape, the grate (9) being disposed above the ground (8) at a distance (a) of between 50 mm and 200 mm, the grate being arranged to be substantially horizontal to the ground (8), wherein the grate (9) has meshes (15) with a width (b) and a height (c) which form substantially vertically extending wind tunnels (14) and which grate (9) is disposed near and above the ground (8) and below and directly in front of the engine inlet (10) which has a diameter (d);

wherein said grating structure diminishes intake vortexes in the jet engine.

12. An apparatus according to claim 11, wherein a radius (r) of the grate (9) is twice the diameter of the engine inlet (10).

13. An apparatus according to claim 11, wherein a central point (11) of the grate (9) is provided approximately perpendicular below a center (12) of the engine inlet (10).

14. An apparatus according to claim 11, wherein the width (b) of the meshes (15) of the grate (9) correspond to the height (c) of the meshes (15).

15. An apparatus according to claim 14, wherein the height (c) of the wind tunnels (14) formed by the meshes (15) of the grate (9) as well as the width (b) of the meshes (15) do not exceed a smallest blade distance of the turbo-compressor of the engine (7).

16. An apparatus according to claim 11, wherein the wind tunnels (14) of the grate (9) comprise a central axis (17) inclined in relation to the ground (8).

17. An apparatus according to claim 11, wherein the distance (a) from the grate (9) to the ground (8) is adjustable.

18. An apparatus according to claim 12, wherein the radius (r) of the grate (9) is between 3 m and 5 m.

* * * * *